Oct. 31, 1950
R. BEACOM
2,528,107
RELEASING THREADING TOOLHOLDER
Filed Dec. 16, 1944
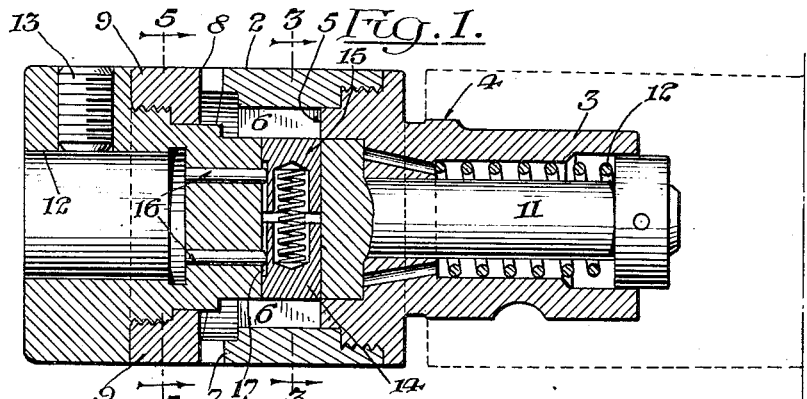
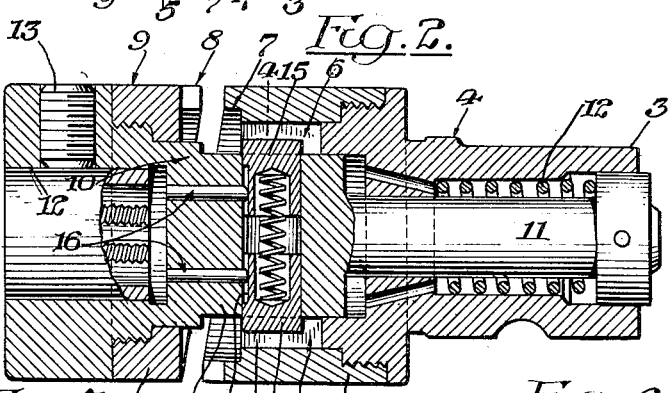
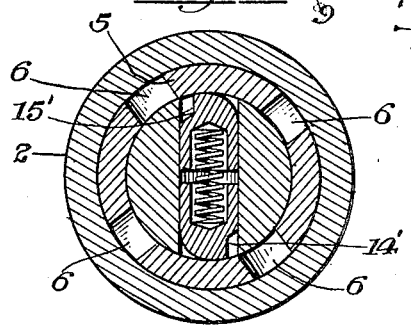
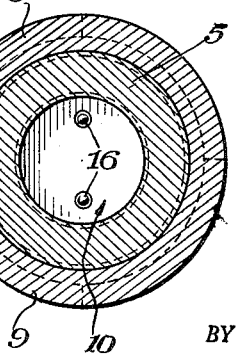
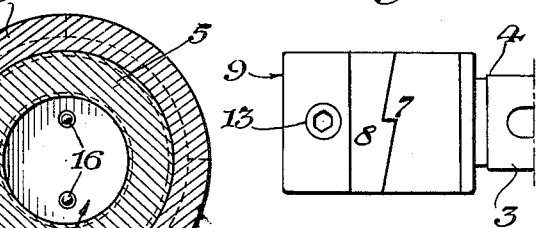
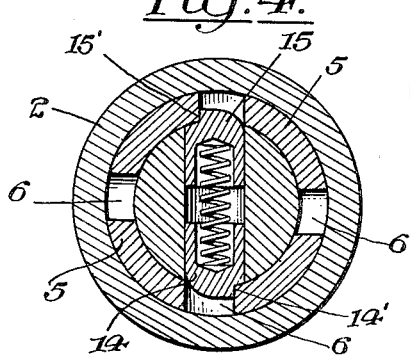
INVENTOR.
Robert Beacom
BY Patented Oct. 31, 1950

2,528,107

UNITED STATES PATENT OFFICE 2,528,107

RELEASING THREADING TOOLHOLDER

Robert Beacom, Cleveland, Ohio, assignor to The National Acme Company, Cleveland, Ohio, a corporation of Ohio Application December 16, 1944, Serial No. 568,535

5 Claims. (Cl. 10—89)

1

This invention relates to threading tool holders and particularly to that type designated as releasing threading tool holders, and is adapted to hold a tap or a die, the object of the invention being to provide an improved threading tool holder of this type, simple in construction and efficient in operation, a particular object being to provide an improved releasing threading tool holder in which all complicated parts, such as rolls, balls, etc., are eliminated, thereby very much simplifying the structure.

In the drawings accompanying and forming a part of this specification,

Fig. 1 is a longitudinal sectional view of this improved threading tool holder illustrating the position of the parts during the tapping operation.

Fig. 2 is a similar view illustrating the position of the parts after the tapping operation is completed.

Fig. 3 is a cross-sectional view taken on line 3—3 of Fig. 1.

Fig. 4 is a cross-sectional view taken on line 4—4 of Fig. 2.

Fig. 5 is a cross-sectional view taken on line 5—5 of Fig. 1.

Fig. 6 is an exterior view of the holder arranged for right-hand threading; and

Fig. 7 is a similar view arranged for left-hand threading.

Similar characters of reference indicate corresponding parts in the several views.

Before explaining in detail the present improvement and its mode of operation, I desire it understood that the invention is not limited to the details of construction and arrangement of parts illustrated in the accompanying drawings since the invention is capable of other embodiments, and that the phraseology employed is for the purpose of description and not of limitation.

This improved threading tool holder in the form shown in Figs. 1 to 7, comprises a cylindrical housing or shell 2 and a bored shank 3 threaded together and forming what is herein described as the outer spindle 4, the shank 3 of which is adapted to be fastened to a rotary spindle such, for instance, as the die spindle of an automatic machine such as a multiple spindle screw machine which, as is well known, comprises an indexible work spindle carrier and a sliding tool carrier and also a die or tap spindle, to which the shank 3 of this holder is fastened for rotation with the die spindle.

This outer spindle 4 has an inner housing 5 (see Fig. 5) having at intervals therearound slots

2 or recesses 6 and this outer spindle 4 is provided at its forward end with clutch teeth 7 in position to cooperate with similar clutch teeth 8 carried by a ring 9 threaded on the end of an inner spindle 10 carried within the outer spindle 4 and having a shank 11 projecting through the bored shank 3 of the outer spindle. On this shank 11 is a coiled spring 12 effective to permit lengthwise shiftable movement of the inner spindle relative to its outer spindle, the coiled spring acting to pull back the inner spindle at a predetermined time.

The inner spindle 10 is provided with a bore 12 for the reception of threading tools such as a tap or die which may be held therein by means of a screw plug 13.

Carried by the inner spindle 10 are a pair of transversely extending spring-pressed pins or plungers 14 and 15, the outer ends of which are tapered and also notched, the notch 14' of one pin and its taper being opposite to the notch 15' and taper of the other pin. These tapered ends permit the proper rotation or retardation of the inner spindle relative to the outer spindle at a predetermined time while the notched ends engage the inner housing 5 at the proper time to hold back the rotation of the inner spindle when the tap is to be backed off the work.

These pins 14 and 15 are held and guided in proper position by suitable guide pins 16 located in the inner spindle 10 and projecting into slots 17 of the pins 14 and 15. These pins 14 and 15 are in position to cooperate with the slots or recesses 6 of the inner housing 5 carried by the outer spindle.

In practice, for right-hand threading of the work, the threading tool when used as a tap is rotated on to the work at a slightly slower speed than the work but at a higher speed in the same direction to screw or back off the tap from the work. For left-hand threading, this is reversed, the tap being rotated faster than the work to thread and slower to back it off but in the same direction. For left-hand threading, however, the clutch teeth 7 and 8 are reversed in the manner shown in Fig. 7.

In the operation of this improved threading tool holder when used as a tap, when the tap enters the work, the clutch teeth 7 and 8 form a driving connection between the inner spindle 10 and the outer spindle 4 so as to rotate the tap to thread the work, the clutch teeth 7 and 8 doing this driving until the tap reaches a predetermined depth of thread in the work, at which time, forward movement of the die spindle is stopped, but not its rotation, by the usual means such as a stop rod provided for the purpose and fastened to the framework of the machine. When the die or tap spindle is stopped in its forward travel, the inner spindle 10, because of its engagement with the work, is pulled forward relative to the housing of the outer spindle approximately ³⁄₁₆" (see Fig. 2) against the action of the coil spring 12, separating the driving clutch teeth 7 and 8 and so permitting the inner spindle to rotate with the work independently of the outer spindle and until, during this forward movement of the inner spindle 10, the pins or plungers 14 and 15 are pressed outwardly by their springs and project into a pair of the slots 6 of the inner housing which thus again connect the inner spindle with the outer spindle whereupon, when the usual clutch is shifted to rotate the die spindle at a higher speed than that of the work for right-hand threading, these pins or plungers act as a brake and so retard the inner spindle and thus back off or remove the tap from the work. The tap is reset by the coil spring 12 which, as soon as the tap backs off or rotates free of the work, draws the inner spindle 10 back again. The meshing of the clutch teeth rotates the inner spindle, thereby compressing the plungers or pins 14 and 15, whereupon the tap is in readiness for another tapping operation.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. In a releasing threading tool holder, an outer spindle having an inner housing provided at intervals therearound with recesses, said outer spindle also being provided at its forward end with replaceable clutch teeth, an inner spindle carried within the outer spindle and having a replaceable clutch toothed ring on the end thereof engageable with the clutch teeth on the forward end of the outer spindle, a bored shank on said outer spindle, a shank on said inner spindle projecting through said bored shank of the outer spindle, a coil spring interengaging said shanks to permit and control lengthwise shiftable movement of the inner spindle relative to the outer spindle, a threading tool receiving bore in said inner spindle, a pair of transversely extending spring pressed plungers carried by said inner spindle, said plungers having their outer ends tapered and extendable into the recesses in the inner housing, a coil spring compressed between said plungers and tending to separate them to project the tapered ends thereof into the recesses when the plungers are aligned with the recesses, said plungers extending transversely of the shank of said inner spindle and being positioned between the threading tool receiving bore and the coil spring interengaging the shanks.

2. In a releasing threading tool holder, an outer spindle having an inner housing provided at intervals therearound with recesses, said outer spindle also being provided at its forward end with clutch teeth, an inner spindle carried within the outer spindle and having a clutch toothed ring on the end thereof engageable with the clutch teeth on the forward end of the outer spindle, a bored shank on said outer spindle, a shank on said inner spindle projecting through said bored shank of the outer spindle, a coil spring interengaging said shanks to permit and control lengthwise shiftable movement of the inner spindle relative to the outer spindle, a threading tool receiving bore in said inner spindle, a pair of transversely extending spring pressed plungers carried by said inner spindle, said plungers having the outer ends thereof tapered and extendable into the recesses in the inner housing, a coil spring compressed between said plungers and tending to separate them to project the tapered ends thereof into the recesses when the plungers are aligned with the recesses, said plungers extending transversely of the shank of said inner spindle and being positioned between the threading tool receiving bore and the coil spring interengaging the shanks.

3. In a releasing threading tool holder, an outer spindle having an inner housing provided at intervals therearound with recesses, said outer spindle also being provided at its forward end with clutch teeth, an inner spindle carried within the outer spindle and having a clutch toothed ring on the end thereof engageable with the clutch teeth on the forward end of the outer spindle, a bored shank on said outer spindle, a shank on said inner spindle projecting through said bored shank of the outer spindle, a coil spring interengaging said shanks to permit and control lengthwise shiftable movement of the inner spindle relative to the outer spindle, a threading tool receiving bore in said inner spindle, a pair of transversely extending spring pressed plungers carried by said inner spindle, said plungers having cam surfaces on the outer ends thereof extendable into the recesses in the inner housing, to allow the inner spindle to rotate in one direction only relative to the inner housing of the outer spindle, a coil spring compressed between said plungers and tending to separate them to project the ends thereof into the recesses when the plungers are aligned with the recesses, said plungers extending transversely of the shank of said inner spindle and being positioned between the threading tool receiving bore and the coil spring interengaging the shanks.

4. In a releasing threading tool holder, a hollow outer spindle having recesses internally thereof and spaced at intervals thereabout, a bored shank on one end of said outer spindle, a replaceable drive clutch ring on the other end of said outer spindle, an inner spindle carried within the outer spindle and having an opening for receiving a threading tool, a clutch ring replaceably mounted on said inner spindle and drivingly engageable with said drive clutch ring, an inner shank on said inner spindle extending through said bored shank of said outer spindle, a clutch spring interengaging said shanks and tending to hold said clutch rings in engagement, and a pair of transversely extending plungers carried by said inner spindle in alignment with said recesses between said tool receiving hole and said shank, said transversely extending plungers having cam surfaces on the ends thereof extendable into the recesses to allow the inner spindle to rotate in one direction only relative to the outer spindle, a spring extending between said plungers and urging said plungers apart to project the plungers into the recesses when the plungers are aligned with the recesses.

5. In a releasing threading tool holder, a hollow outer spindle having recesses internally thereof and spaced at intervals thereabout, a bored shank on one end of said outer spindle, a replaceable drive clutch ring on the other end of said outer spindle, an inner spindle carried within the outer spindle and having an opening for receiving a threading tool, a clutch ring replaceably mounted on said inner spindle and drivingly engageable with said drive clutch ring, an inner shank on said inner spindle extending through said bored shank of said outer spindle, a clutch spring interengaging said shanks and tending to hold said clutch rings in engagement, and a pair of transversely extending plungers carried by said inner spindle in alignment with said recesses between said tool receiving hole and said shank, said plungers having the outer ends thereof tapered and extendable into the recesses, a spring extending between said plungers and urging said plungers apart to project the tapered ends of said plungers into the recesses when the plungers are aligned with the recesses.

ROBERT BEACOM.

REFERENCES CITED

The following references are of record in the file of this patent:

UNITED STATES PATENTS

| Number | Name | Date |
|---|---|---|
| Re. 12,269 | Hunter | Sept. 20, 1904 |
| 211,742 | Johnston | Jan. 28, 1879 |
| 976,880 | Hunter | Nov. 29, 1910 |
| 1,126,919 | Tyson | Feb. 2, 1915 |
| 1,188,437 | Gates | June 27, 1916 |
| 1,254,933 | Peuch et al. | Jan. 29, 1918 |
| 1,290,427 | Velk | June 7, 1919 |
| 1,425,226 | Whitman | Aug. 8, 1922 |
| 1,740,887 | Crosby | Dec. 24, 1929 |
| 2,147,203 | Kylin | Feb. 14, 1939 |
| 2,287,192 | Mueller | June 23, 1942 |
| 2,340,477 | Kruse | Feb. 1, 1944 |
| 2,356,669 | Hook | Aug. 22, 1944 |
| 2,370,885 | Sohm | Mar. 6, 1945 |